(12) United States Patent
Sugimoto et al.

(10) Patent No.: US 8,569,919 B2
(45) Date of Patent: Oct. 29, 2013

(54) GENERATOR MOTOR

(75) Inventors: Yukihiko Sugimoto, Kamakura (JP);
Teiichirou Chiba, Hiratsuka (JP);
Takashi Kikuchi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/809,143

(22) PCT Filed: Mar. 26, 2012

(86) PCT No.: PCT/JP2012/057741
§ 371 (c)(1),
(2), (4) Date: Jan. 8, 2013

(87) PCT Pub. No.: WO2012/133299
PCT Pub. Date: Oct. 4, 2012

(65) Prior Publication Data
US 2013/0119803 A1    May 16, 2013

(30) Foreign Application Priority Data

Mar. 31, 2011  (JP) .................................. 2011-077240

(51) Int. Cl.
*H02K 5/04*    (2006.01)
*H02K 5/16*    (2006.01)

(52) U.S. Cl.
USPC ............. 310/90; 310/216.113; 310/216.121; 310/216.127

(58) Field of Classification Search
USPC ......... 310/90, 91, 216.113, 216.121, 216.127
See application file for complete search history.

(56) References Cited

U.S. PATENT DOCUMENTS

| 2007/0052305 | A1* | 3/2007 | Roundell ........................ 310/52 |
| 2009/0302720 | A1* | 12/2009 | Chiba ......................... 310/75 R |
| 2011/0001400 | A1 | 1/2011 | Chiba et al. |
| 2011/0057538 | A1* | 3/2011 | Horng et al. .......... 310/216.113 |
| 2012/0299419 | A1* | 11/2012 | Tanaka et al. ................. 310/90 |
| 2013/0119803 | A1* | 5/2013 | Sugimoto et al. ............. 310/91 |

FOREIGN PATENT DOCUMENTS

| CN | 1844689 A | 10/2006 |
| JP | 1-149009 U | 10/1989 |
| JP | 2007-174752 A | 7/2007 |
| JP | 2009-71905 A | 4/2009 |
| JP | 2010-154593 A | 7/2010 |
| JP | 2010-272254 A | 12/2010 |

OTHER PUBLICATIONS

Chinese Office Action of corresponding Chinese Application No. 201280001949.2, issued on May 21, 2013.

* cited by examiner

*Primary Examiner* — Tran Nguyen
*Assistant Examiner* — David Scheuermann
(74) *Attorney, Agent, or Firm* — Global IP Counselors, LLP

(57) ABSTRACT

A generator motor includes a flange, stationary-side members, rotor-side members, and latching members. The flange is removably mounted on a first end side in an axial direction. The stationary-side members are fixed on a second end side that is on an opposite side from the first end side in the axial direction. The rotor-side members are configured to move toward the first end side in the axial direction with respect to the stationary-side members in a state in which the flange has been removed. The latching members are configured to restrict relative movement of the flange in the axial direction with respect to the rotor-side members.

10 Claims, 9 Drawing Sheets

GENERATOR MOTOR

CROSS-REFERENCE TO RELATED APPLICATIONS

This application claims priority to Japanese Patent Application No. 2011-077240 filed on Mar. 31, 2011, the disclosure of which is hereby incorporated herein by reference in its entirety.

BACKGROUND OF THE INVENTION

1. Field of the Invention

The present invention relates to a generator motor that is installed in a hybrid hydraulic excavator or the like, for example.

2. Description of the Related Art

So-called hybrid construction machines, in which a generator motor is installed between the engine and a hydraulic pump, have been under development in recent years.

The generator motor installed in a hybrid construction machine is connected to the output shaft of the engine and the input shaft of the hydraulic pump, and generates power from the drive force of the engine. The electrical energy generated by the generator motor is stored in a capacitor or other such electrical storage device, and when the construction machine requires a high engine output, for example, the generator motor is driven by the stored electrical energy and boosts the output of the engine.

For example, Japanese Laid-Open Patent Application 2009-71905 (laid open Apr. 2, 2009 discloses a generator motor (power unit) in which adequate lubricating oil is supplied to spline joints at both ends of a linking shaft that spline-joins the output shaft of the engine and the input shaft of a hydraulic pump.

SUMMARY

However, the following problems were encountered with the above-mentioned conventional generator motor.

With the generator motor disclosed in the above-mentioned publication, the parts usually have to be removed from the hydraulic pump side when the generator motor needs to be taken apart for maintenance or in the event of a malfunction, etc. Therefore, when the generator motor is taken apart, after the hydraulic pump is removed, the flange disposed on the hydraulic pump side is first removed.

At this point, although the flange is in a state of being loosely fitted together with the rotor-side members at the bearing, since it is not fixed to the rotor-side members, it can be removed by itself by moving it in the axial direction. However, movement of the rotor-side members remaining on the stationary side (the engine side) is restricted from the outside by the flange. Furthermore, since the rotor-side members are housed inside the housing of the generator motor in a state of being able to rotate with respect to the stator, etc. (the stationary-side members), they do not restrict movement in the axial direction with the stator and other stationary-side members.

Because of the above, with a conventional generator motor configuration, once the flange is removed, the rotor-side members remaining on the stationary side are able to move in the axial direction, so there is a risk that they will accidentally fall off from the stationary side and damage the parts of the rotor-side members.

More specifically, when the flange is moved in the axial direction, the rotor-side members either move along with the flange or stay on the stationary side depending on whether the frictional force at the flange bearing or the frictional force at the spline joints on the engine side is greater. For example, if the frictional force at the spline joints on the engine side is greater, the rotor-side members will end up staying on the stationary side. On the other hand, if the frictional force at the flange bearing is greater, the rotor-side members are removed along with the flange. That is, when the flange is removed during disassembly of the generator motor, whether the rotor-side members are removed as a unit or stay on the stationary side is affected by which internal frictional force is greater.

It is an object of the present invention to provide a generator motor with which the rotor-side members are prevented from falling out from the stationary side when the generator motor is taken apart.

The generator motor pertaining to the first aspect comprises a flange, stationary-side members, rotor-side members, and latching members. The flange is removably mounted on a first end side in the axial direction. The stationary-side members are fixed on a second end side that is on the opposite side from the first end side in the axial direction. The rotor-side members are capable of moving toward the first end side in the axial direction with respect to the stationary-side members in a state in which the flange has been removed. The latching members restrict relative movement of the flange in the axial direction with respect to the rotor-side members.

With a generator motor that is taken apart from the first end side where the flange is disposed, latching members that restrict movement of the flange in the axial direction with respect to the rotor-side members and allow the flange and the rotor-side members to be moved integrally are provided in order to prevent the rotor-side members from falling out of the stationary-side members when the flange is removed.

Since the stationary-side members and the rotor-side members are in a relation that allows mutually relative rotation, they are not joined together, and are in a relation such that they readily separate unless pressed from the outside in the axial direction. Also, the above-mentioned flange is the member that is first removed on the first end side (the free end) in disassembling the generator motor, and functions as a cover for holding the rotor-side members and so forth of the generator motor inside the housing. Thus, when this flange has been removed, the rotor-side members are not latched to the stationary-side members, and if the flange is removed, there is the risk that the rotor-side members will fall out of the stationary-side members.

With the generator motor of this aspect, latching members are provided that restrict relative movement of the flange in the axial direction with respect to the rotor-side members, so that the two can be moved integrally.

Consequently, when the flange is removed on the first end side (the free end side), the rotor-side members can also be removed together with the flange. This avoids a situation in which just the flange is removed and the rotor-side members are able to move freely in the axial direction with respect to the stationary-side members. As a result, the rotor-side members can be effectively prevented from falling out on the stationary side during disassembly of the generator motor.

The latching members may be provided on the flange side, or on the rotor-side members side.

The generator motor pertaining to the second aspect is the generator motor pertaining to the first aspect, wherein the latching members are provided to the flange.

Here, the latching members that integrate the flange and the rotor-side members in the axial direction are provided on the flange side.

Consequently, when the flange is removed during disassembly of the generator motor, the latching members provided to the flange can be hooked onto part of the rotor-side members, which allows the flange and the rotor-side members to be removed on the first end side in an integrated state.

The generator motor pertaining to the third aspect is the generator motor pertaining to the first or second aspect, wherein the latching members are provided near the outer peripheral face of a rotary shaft included in the rotor-side members.

Here, the latching members that restrict relative movement of the flange and the rotor-side members in the axial direction are provided near the outer peripheral face of a rotary shaft that is the rotational center of the rotor-side members.

Consequently, if parts of the latching members are hooked onto grooves, stepped portions, etc., formed in the outer peripheral face of the rotary shaft, for example, relative movement of the flange in the axial direction with respect to the rotor-side members can be easily restricted.

The generator motor pertaining to the fourth aspect is the generator motor pertaining to any of the first to third aspects, wherein the latching members are capable of rotating around a rotary shaft, and the rotation of the latching members switches between a latched state in which the stationary-side members and the rotor-side members are integrated in the axial direction, and an unlatched state in which this integration has been released.

Here, the latching members are rotated around the rotary shaft when the integration of the flange and the rotor-side members is released.

Consequently, when the generator motor is taken apart, the rotor-side members and the flange removed from the stationary-side members in a state of being mutually integrated can be easily separated merely by rotating the latching members.

The generator motor pertaining to the fifth aspect is the generator motor pertaining to the fourth aspect, further comprising restricting grooves for restricting the rotational range of the latching members.

Here, the rotational range of the rotatable latching members is restricted by restricting grooves.

These restricting grooves are preferably provided to a face on the first end side of the flange, for example.

Consequently, in a state in which part of the latching members is in contact with one end face of the restricting grooves, there can be a first state in which the rotor-side members are latched to the stationary-side members, and in a state in which part of the latching members is in contact with the end face on the opposite side of the restricting grooves, there can be a second state in which the rotor-side members are open with respect to the stationary-side members. Thus, the state can be easily switched between the above-mentioned first and second states merely by rotating the latching members within the range of the restricting grooves.

The generator motor pertaining to the sixth aspect is the generator motor pertaining to any of the first to fifth aspects, wherein the latching members are substantially L-shaped members.

Here, substantially L-shaped members are used as the latching members.

Consequently, the flange and the rotor-side members can be easily integrated merely by hooking the end of the substantially L-shaped latching members to a step, groove, etc., formed on the rotor-side members side.

The generator motor pertaining to the seventh aspect is the generator motor pertaining to any of the first to sixth aspects, wherein the latching members have a prescribed gap between themselves and the rotating rotor-side members.

Consequently, the rotation of the rotor-side members is not hindered by the latching members.

The generator motor pertaining to the eighth aspect is the generator motor pertaining to any of the first to seventh aspects, wherein the stationary-side members include a first housing fixed on an adjacent engine side, a second housing joined to the first housing, and a stator provided in a space inside the first and second housings.

Here, during disassembly of the generator motor, after the flange and the rotor-side members have been removed, there remain the stationary-side members, including the first and second housings that make up the external form of the generator motor, and the stator that is provided inside the first and second housings.

Consequently, when the flange is removed during disassembly of the generator motor, just the rotor-side members can be removed along with the flange.

The generator motor pertaining to the ninth aspect is the generator motor pertaining to any of the first to eighth aspects, wherein the rotor-side members include the rotary shaft and a rotor that rotates around the rotary shaft.

Here, during disassembly of the generator motor, the rotary shaft and the rotor are included in the rotor-side members removed in a state of being integrated with the flange.

Consequently, just the rotary shaft, the rotor, etc., can be easily removed in a state in which the stator, etc., remains with the stationary-side members.

The generator motor pertaining to the tenth aspect is the generator motor pertaining to any of the first to ninth aspects, which is disposed between a hydraulic pump and an engine installed in construction machinery, wherein the stationary-side members are fixed with respect to the engine.

Here, in a generator motor installed between the engine and a hydraulic pump in a hydraulic excavator or other such construction machine, the stationary-side members that remain on the second end side when the generator motor is taken apart are fixed to the engine.

Consequently, the problem of the rotor-side members falling out during disassembly can be effectively avoided.

DETAILED DESCRIPTION OF THE INVENTION

The generator motor 1 pertaining to an embodiment of the present invention will be described through reference to FIGS. 1 to 7b.

In the following description, "axial direction," "radial direction," and "peripheral direction" refer to their respective directions in a state of being installed in the generator motor 1. More specifically, "axial direction" means the axial direction of a rotational shaft 19 of a rotor 14 of the generator motor 1 (the left and right direction in FIG. 1). "Radial direction" means the radial direction of a circle whose center is the rotational shaft 19. And "peripheral direction" means the peripheral direction of a circle whose center is the rotational shaft 19.

Configuration of Generator Motor 1

Figure 1:
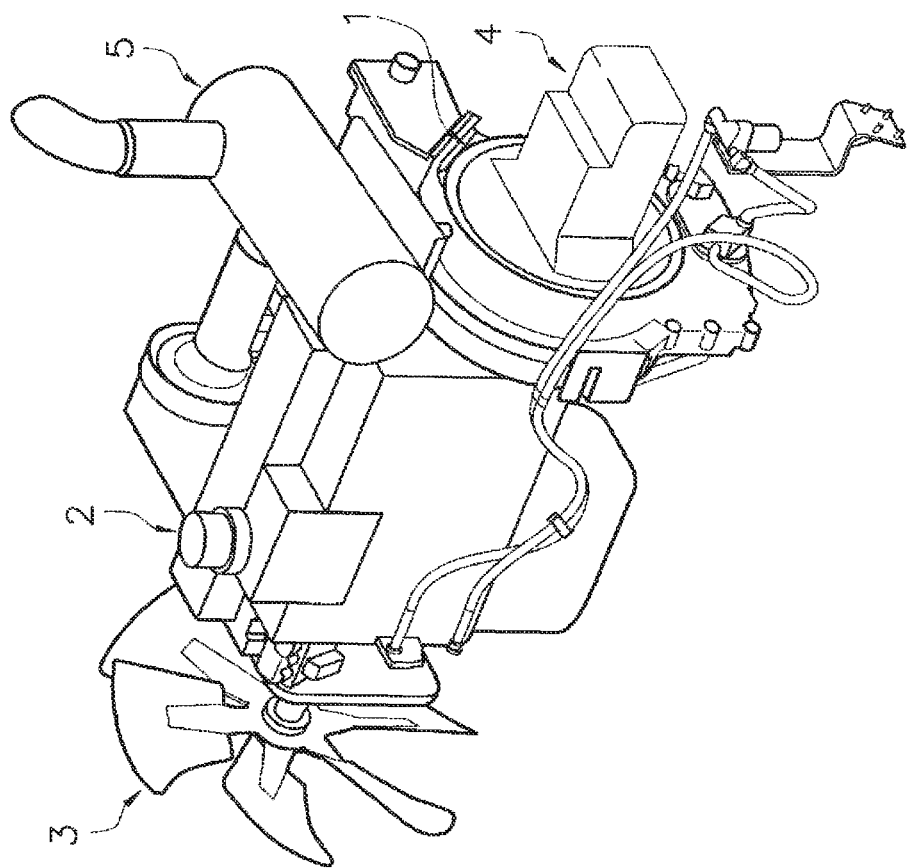
FIG. 1 is an oblique view of the configuration of a hybrid engine in which the generator motor pertaining to an embodiment of the present invention is installed.

As shown in FIG. 1, the generator motor 1 pertaining to this embodiment is installed in a hybrid hydraulic excavator (construction machine) equipped with an engine 2, a cooling fan 3, a hydraulic pump 4, a muffler 5, and so forth, and is disposed between the engine 2 and the hydraulic pump 4. The hybrid hydraulic excavator comprises a traveling unit and a revolving unit provided revolvably to the traveling unit. The revolving unit comprises a work implement, a cab, a counterweight, and an engine compartment. The revolving unit is driven by a rotary electric motor operated by electrical energy from a capacitor or the generator motor 1. The rotary electric motor generates power by regeneration during deceleration of the revolving unit, and the electrical energy obtained by this power generation is stored in a capacitor.

The rotational shaft 19 (see FIG. 2) of the generator motor 1 is directly or indirectly connected to the input shaft of the hydraulic pump 4 and the output shaft of the engine 2, and power is generated by the rotary drive force of the output shaft of the engine 2. The generator motor 1 is connected via an inductor to the capacitor. When the engine speed is rising (when the hydraulic excavator is accelerating), for example, the generator motor 1 is used as needed as an electric motor by means of the electrical energy stored in the capacitor, and assists the rotation of the engine. When the engine is idling, the generator motor 1 receives the rotary drive force of the engine and generates power, and the electrical energy thus generated is stored in the capacitor.

Figure 2:
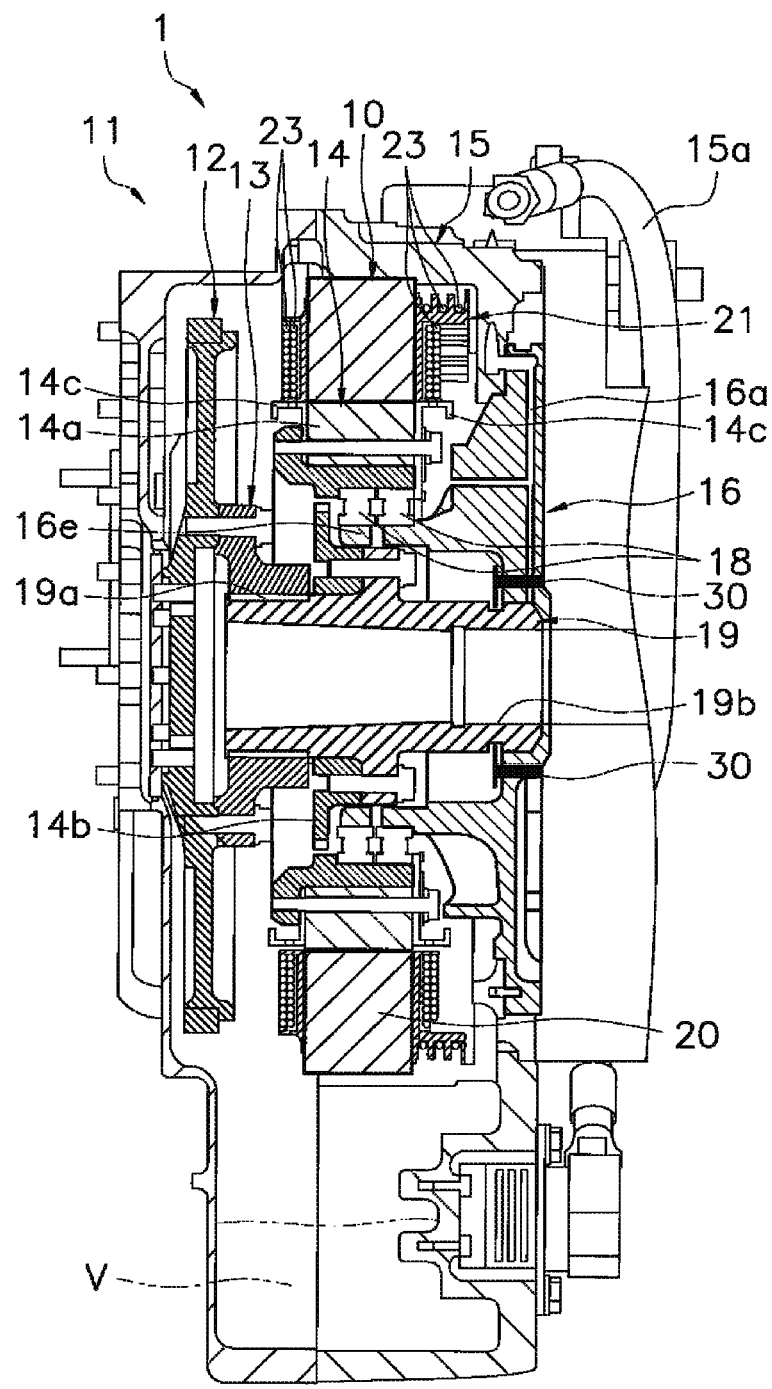
FIG. 2 is a cross section of the configuration of the generator motor installed in the hybrid engine in FIG. 1.
Figure 3:
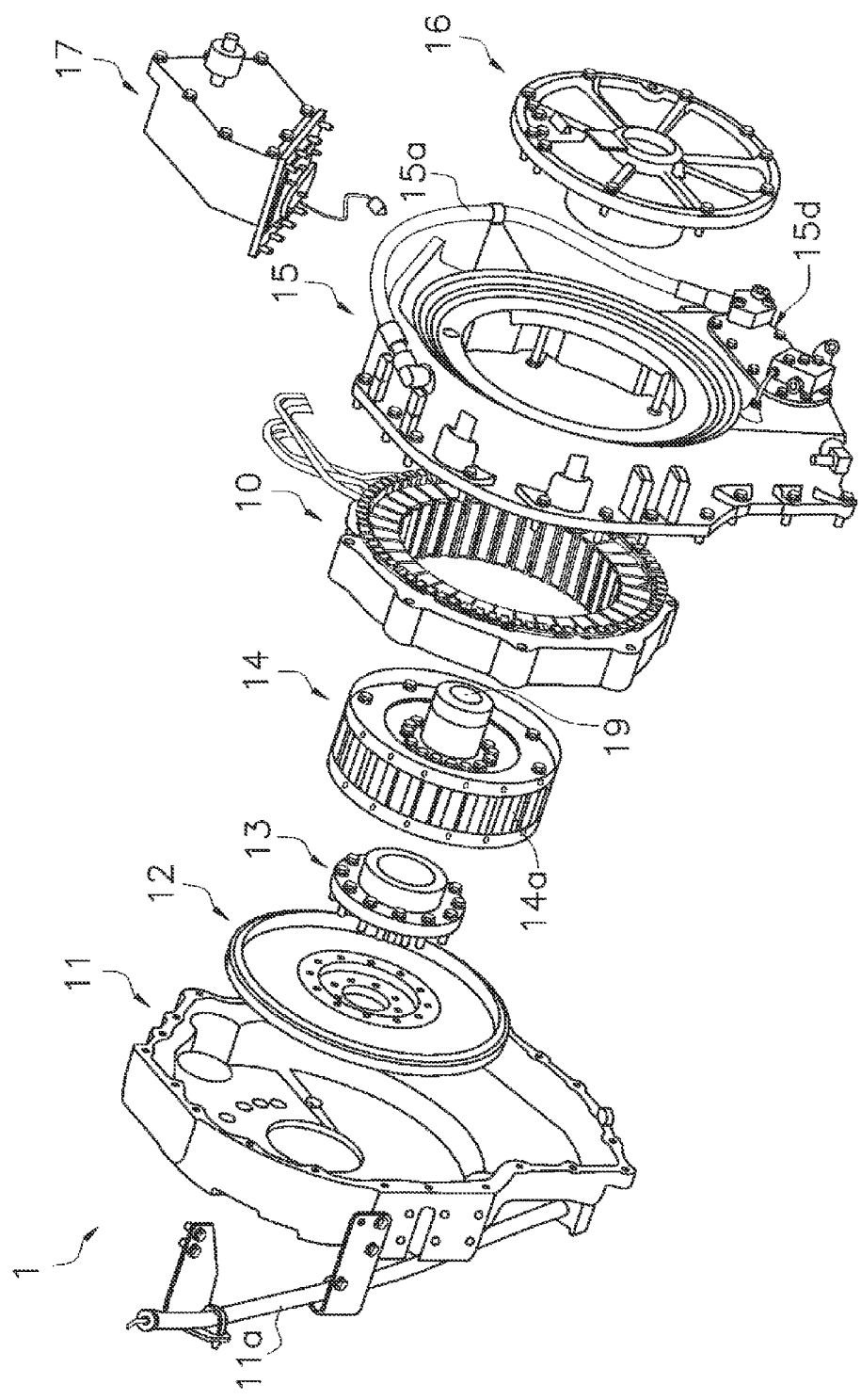
FIG. 3 is an exploded oblique view of the configuration of the generator motor in FIG. 2.

The generator motor 1 is a three-phase, 12-pole SR (switched reluctance) motor, and as shown in FIGS. 2 and 3, comprises a stator 10, a first housing 11, a flywheel 12, a coupling 13, the rotor 14, a second housing 15, a flange 16, and the rotational shaft 19.

As shown in FIG. 3, the stator 10 is provided inside a space formed within the first and second housings 11 and 15, which make up the outer profile of the generator motor 1. As shown in FIG. 2, the stator 10 is made up of a circular stator core 20, an insulator 21, coils 23, and so forth.

The stator core 20 is produced by stacking a plurality of steel plates that include a circular yoke portion and stator teeth portions that are disposed along the peripheral direction and protrude at an equal angular spacing inward in the radial direction from the yoke part. In this embodiment, a stator core 20 that includes a total of 36 protrusions is used to configure a 3-phase, 12-pole SR motor.

An insulator 21 is mounted on each of the protrusions, after which these are wound with the coils 23.

The first housing 11 is made of cast iron, and as shown in FIG. 3, it is joined with the second housing 15 to form a space that internally holds the stator 10, the rotor 14, and so on. A sump V that holds cooling oil for cooling the heat-generating parts of the stator 10 (such as the coils 23) and for lubricating the rotational shaft 19 and a bearing 18 is formed in the lower part of this holding space. Also, as shown in FIG. 3, an oil level detection pipe 11a (also serves as an oil feed pipe) that communicates with the sump V shown in FIG. 2 is connected to the lower end of the first housing 11.

The cooling oil held in the sump V inside the first and second housings 11 and 15 is circulated by a circulation pump, is cooled by going through a cooling device (such as an oil cooler 15d (see FIG. 3)) provided to the lower part of the second housing 15, and then goes back into the space inside the first and second housings 11 and 15.

The flywheel 12 is provided on the engine output shaft side within the first and second housings 11 and 15, is connected via the coupling 13 to the rotor 14, and rotates inside the first and second housings 11 and 15.

As shown in FIG. 3, the coupling 13 is a substantially circular member, and is bolted to the flywheel 12. The coupling 13 is such that splines formed on the inner radial side mesh with external splines 14aa formed on the outer radial side of the rotational shaft 14a. Consequently, the flywheel 12 and the coupling 13 rotate along with the rotor 14 around the rotational shaft 19. However, while the rotational shaft 19 and the coupling 13 are spline-joined in the rotational direction, they are not joined to each other in the axial direction, and are in a relation such that they readily separate if not restrained from the outside in the axial direction by the first and second housings 11 and 15.

The rotor 14 is a member on the rotating side, which rotates around the rotational shaft 19, and is disposed in a space on the inner peripheral side of the circular stator 10 in the holding space inside the first and second housings 11 and 15. The rotor 14 has a holder 14b to which a rotor yoke 14a is attached on the outer peripheral side.

The rotor yoke 14a is a structure consisting of a plurality of laminated steel plates (magnetic steel plates), and as shown in FIG. 2, is bolted to the outer peripheral face side of the holder 14b, and has a plurality of inductors (not shown) provided at an equal angular spacing in the peripheral direction on the outer peripheral face side of a circular main body. The rotor yoke 14a is supported so as to be sandwiched by aluminum blades 14c provided on the engine 2 side and the hydraulic pump 4 side. Through-holes that open outward in the radial direction are formed in the outer peripheral faces of the blades 14c. When the rotor 14 rotates, cooling oil is sprayed through these through-holes onto the coils 23 disposed on the outside in the radial direction. These blades 14c need not be provided if the rotor yoke 14a can be supported by recesses formed in the holder 14b, for example.

As shown in FIG. 2, the holder 14b is bolted to the outer peripheral portion of the rotational shaft 19 in a state in which the rotational shaft 19 has been inserted into a center hole. Also, the holder 14b is a steel member having a substantially cylindrical shape, and is a structure in which an inner cylinder is combined with an outer cylinder. The bearing 18 is attached between the outer peripheral face of this inner cylinder and the inner peripheral face of the outer cylinder, and the rotor yoke 14a is attached to the outer peripheral face of the outer cylinder.

Figure 5:
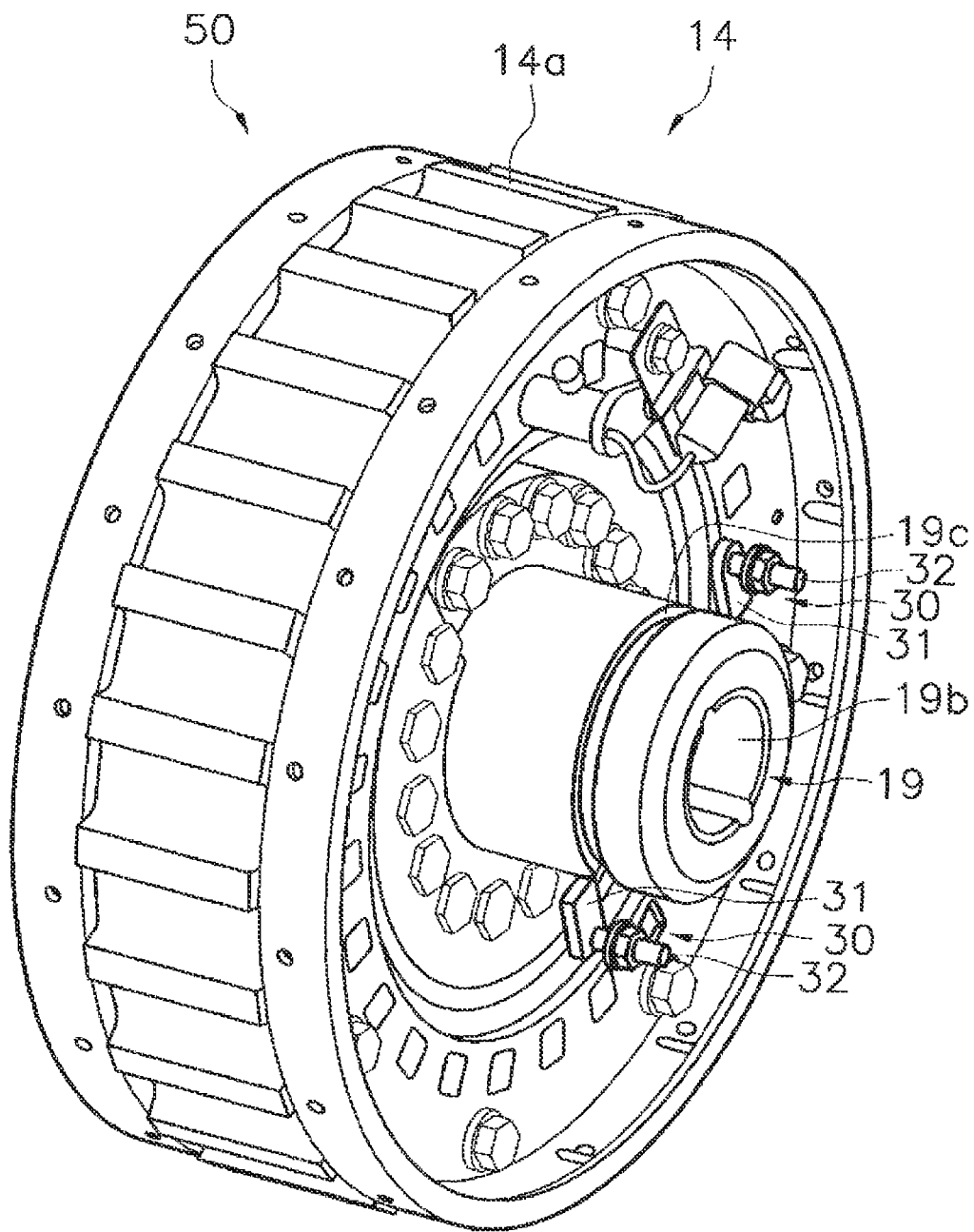
FIG. 5 is an oblique view of the relation between the latching members and the rotor-side members in FIG. 4.

The rotational shaft 19 is a cylindrical member that serves as the rotational center of the rotor 14, and has a through-hole that passes from one end to the other in the axial direction. External splines 19a that mate with the internal teeth of the coupling 13 are formed at the end of the rotational shaft 19 on the engine 2 side, and internal splines 19b that mate with the input shaft on the hydraulic pump 4 side are formed at the end on the hydraulic pump 4 side. The rotational shaft 19 is fixed in a state in which the half on the hydraulic pump 4 side in the axial direction is inserted on the inner peripheral face side of the inner cylinder of the flange 16. As shown in FIG. 5, etc., a latching groove 19c extending in the peripheral direction is formed in the outer peripheral face of the rotational shaft 19 on the hydraulic pump 4 side. The latching members 30 that are inserted into this latching groove 19c will be discussed at a later stage.

The second housing 15 is a cast iron member, is provided on the hydraulic pump 4 side of the generator motor 1, and along with the first housing 11 forms a holding spacing for holding the flywheel 12, the coupling 13, the rotor 14, the stator 10, and the rotational shaft 19. The second housing 15 has an oil cooler 15d for cooling the cooling oil. The outlet of the oil cooler 15d is connected to a cooling oil pipe 15a for sending cooling oil up to the upper part inside the first and second housings 11 and 15. An electrical box 17 connected to the wiring of the coils 23 wound around the protrusions of the stator core 20 via the insulator 21 is attached to the shoulder of the second housing 15.

The cooling oil held in the sump V goes through a pipe (not shown), a filter (not shown), and a circulation pump and is supplied to the inlet of the oil cooler 15d provided at the lower part of the second housing 15. The cooling oil pipe 15a connected to the outlet of the oil cooler 15d is connected to the upper connection portion of the second housing 15 as shown in FIG. 3 in order to supply cooling oil scooped up from the sump V to the upper part of the space formed inside the first and second housings 11 and 15.

As shown in FIG. 2, the flange 16 is a disk-shaped member disposed coaxially with the rotational shaft 19, and in its interior is formed a cooling oil path 16a that guides the cooling oil sent through the cooling oil pipe 15a to the upper part of the second housing 15, to the desired portions. The flange 16 is fixed by a plurality of bolts to the hydraulic pump 4 side of the second housing 15. The flange 16 has a substantially cylindrical bearing support 16e that protrudes in the axial direction from a substantially disk-shaped face. The bearing support 16e supports the bearing 18 on the substantially cylindrical outer peripheral face side. The flange 16 also has restricting grooves 16b into which the latching members 30 (discussed below) are inserted, through-holes 16c, and a center hole 16d (see FIG. 7a). The configuration of how the flange 16 and the rotational shaft 19 (rotor-side members 50) are integrated by these latching members 30 will be discussed in detail below.

The cooling oil path 16a supplies cooling oil that has flowed from the upper space inside the first and second housings 11 and 15, to the bearing 18, splines (joining portions), and so forth in contact with the members on the stationary side and with the rotor 14 and the rotational shaft 19. Consequently, a sufficient quantity of lubricating oil is supplied at all times to the bearing 18, splines (joining portions), and so forth. The cooling oil that moves through the cooling oil path 16a then moves outward in the radial direction under the centrifugal force produced by rotation of the rotor-side members 50, is supplied to the coils 23 on the hydraulic pump 4 side, and functions as cooling oil for cooling the coils 23. This oil goes through the through-hole on the inside of the rotational shaft 19 to lubricate and cool the splines on the engine 2 side. After this, the oil moves outward in the radial direction under the centrifugal force produced by rotation of the rotor-side members 50, and is used to cool the coils 23 provided on the engine 2 side.

The restricting grooves 16b restrict the rotational range (rotational angle) of latching portions 31 of the latching members 30 (discussed below).

The rotary shafts 32 of the latching members 30 (discussed below) are inserted into the through-holes 16c, and are fixed with bolts and nuts (see FIG. 5).

The center hole 16d is provided in the center of the disk-shaped flange 16, and the end of the rotational shaft 19 on the hydraulic pump 4 side is inserted in a state in which the generator motor 1 has been assembled.

Latching Members 30

Figure 4:
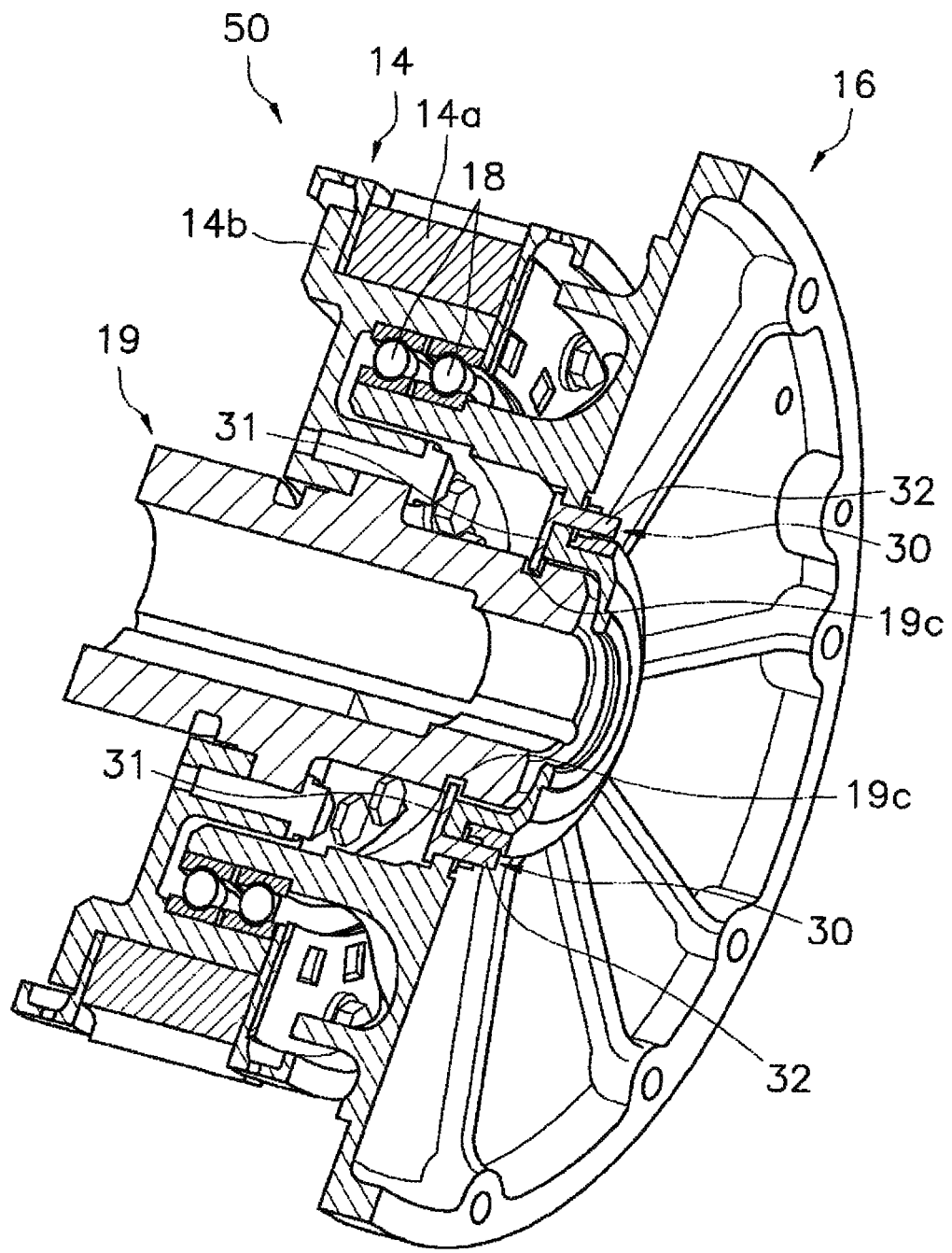
FIG. 4 is an exploded oblique view of the configuration of the rotor-side members removed integrally with the flange when the generator motor in FIG. 2 is taken apart.

As shown in FIG. 4, with the generator motor 1 of this embodiment, the latching members 30 are provided to restrict relative movement in the axial direction between the flange 16 and the rotor-side members 50.

As shown in FIG. 4, two of the latching members 30 are provided along the outer peripheral portion of the center hole 16d of the flange 16, and these restrict the relative movement of the flange 16 and the rotational shaft 19 in the axial direction, integrating them. As shown in FIG. 4, the latching members 30 are substantially L-shaped members in lateral cross section, and each have a latching portion 31 and a rotary shaft 32.

The latching portions 31 are flat members that are inserted into the latching groove 19c of the rotational shaft 19. When these rotate around the rotary shafts 32 (see the two-dot chain line arrow in FIG. 6), they switch between a latched state of the flange 16 with respect to the rotational shaft 19 (see the lower latching member 30 in FIG. 6) and an unlatched state (see the upper latching member 30 in FIG. 6).

The rotary shafts 32 are cylindrical members that serve as the rotational center of the latching members 30, and are fixed to the flange 16 so as not to come loose from the through-holes 16c by bolts and nuts (see FIG. 6) in a state of being inserted into the through-holes 16c formed near the outer peripheral part of the center hole 16d in the flange 16 shown in FIG. 7b.

Here, in a state in which the generator motor 1 has been assembled (usage state), the latching members 30 are inserted into the latching groove 19c of the rotational shaft 19, and the flange 16 and the rotational shaft 19 are integrated in the axial direction (in a latched state). At this point the latching members 30 are inserted in a non-contact state with respect to the latching groove 19c of the rotational shaft 19. Accordingly, providing the latching members 30 does not adversely affect the rotation of the rotor-side members 50. The latching groove 19c preferably is narrow enough not to touch part of the latching members 30 even when the rotor-side members 50 have moved in the axial direction due to looseness of the rotational shaft 19.

Disassembly of Generator Motor 1

The generator motor 1 in this embodiment has the configuration discussed above, and during maintenance, in the event of a malfunction, and so forth, the parts are removed from the hydraulic pump 4 side (the first end side), which is the side nearest the body opening, in a state in which the first housing 11 and other stationary-side members are fixed to the engine 2 side (the second end side).

In this embodiment, the "rotor-side members 50" refers to components other than the flange 16 shown in FIG. 4, namely, components including the rotor 14, the rotational shaft 19, and so on. Meanwhile, "stationary-side members" refers to the components that remain on the engine 2 side after the rotor-side members 50 have been removed from the generator motor 1, namely, components including the first and second housings 11 and 15, the stator 10, the flywheel 12, and the coupling 13.

More specifically, when the generator motor 1 is taken apart, the hydraulic pump 4 is removed, after which the plurality of bolts fixing the flange 16 are loosened and the flange 16 is removed from the second housing 15.

In this embodiment, at this point the flange 16 and the rotational shaft 19 are integrated in the axial direction by the above-mentioned latching members 30. Consequently, as shown in FIG. 4, when the flange 16 is removed, the rotor-side members 50 (the rotor 14, the bearing 18, and the rotational shaft 19) can be removed along with the flange 16.

As shown in FIG. 4, this is because the latching portions 31 of the latching members 30 are in a latched state of being inserted in a non-contact state in the latching groove 19c formed in the outer peripheral face of the rotational shaft 19, and when the flange 16 is moved in the axial direction to the hydraulic pump 4 side, the rotational shaft 19 and the members that are fixed with respect to the rotational shaft 19 (such as the rotor 14) that are in a latched stated move in an integrated state. Specifically, the latching portions 31 are inserted in a non-contact state into the latching groove 19c in a direction perpendicular to the axial direction. Thus, when the flange 16 is moved in the axial direction, the latching members 30 attached to the flange 16 also move in the axial direction, and the distal ends of the latching portions 31 hit the face of the latching groove 19c on the hydraulic pump 4 side. Accordingly, when the flange 16 is moved in the axial direction, the rotational shaft 19 is hooked to a portion of the latching groove 19c by the latching members 30, allowing integrated movement.

If the latching members 30 of this embodiment were not provided, then when the latching groove 19c was moved in the axial direction along with the flange 16, whether the rotor-side members 50 moved along with the flange 16 side or remained on the first housing 11 side would be decided by the difference between the frictional force at the bearing 18 of the flange 16 and the frictional force at the spline joints on the engine 2 side. For example, if the frictional force is higher at the spline joint on the engine 2 side, the rotor-side members 50 ends up remaining on the first housing 11 side. On the other hand, if the frictional force is higher at the bearing of the flange 16, the rotor-side members 50 will be removed along with the flange 16 and the rotational shaft 19.

In view of this, with the generator motor 1 in this embodiment, the latching members 30 are provided so that the rotor-side members 50 can be reliably removed integrally with the flange 16 side.

Consequently, when the flange 16 is removed in the process of taking apart the generator motor 1, this avoids a situation in which the rotor-side members 50 remains in a state of being able to move in the axial direction with respect to the first housing 11 and other stationary-side members. As a result, this prevents the rotor-side members 50 remaining on the stationary side from accidentally falling out after just the flange 16 has been removed, which in turn prevents the parts included in the rotor-side members 50 from being damaged.

Furthermore, in this embodiment, as shown in FIG. 4, the flange 16 and the rotor-side members 50 are separated in order to perform maintenance, repair, etc., on the rotor 14 and so forth included in the rotor-side members 50 after removal from the engine 2 side (the stationary side) in a state in which the flange 16 and the rotor-side members 50 are integrated.

As discussed above, the latching members 30 here are attached to the flange 16 in a state of being able to rotate around the rotary shafts 32. Therefore, when the flange 16 and the rotor-side members 50 are unlatched from each other, the latching members 30 are rotated around the rotary shafts 32.

Figure 6:
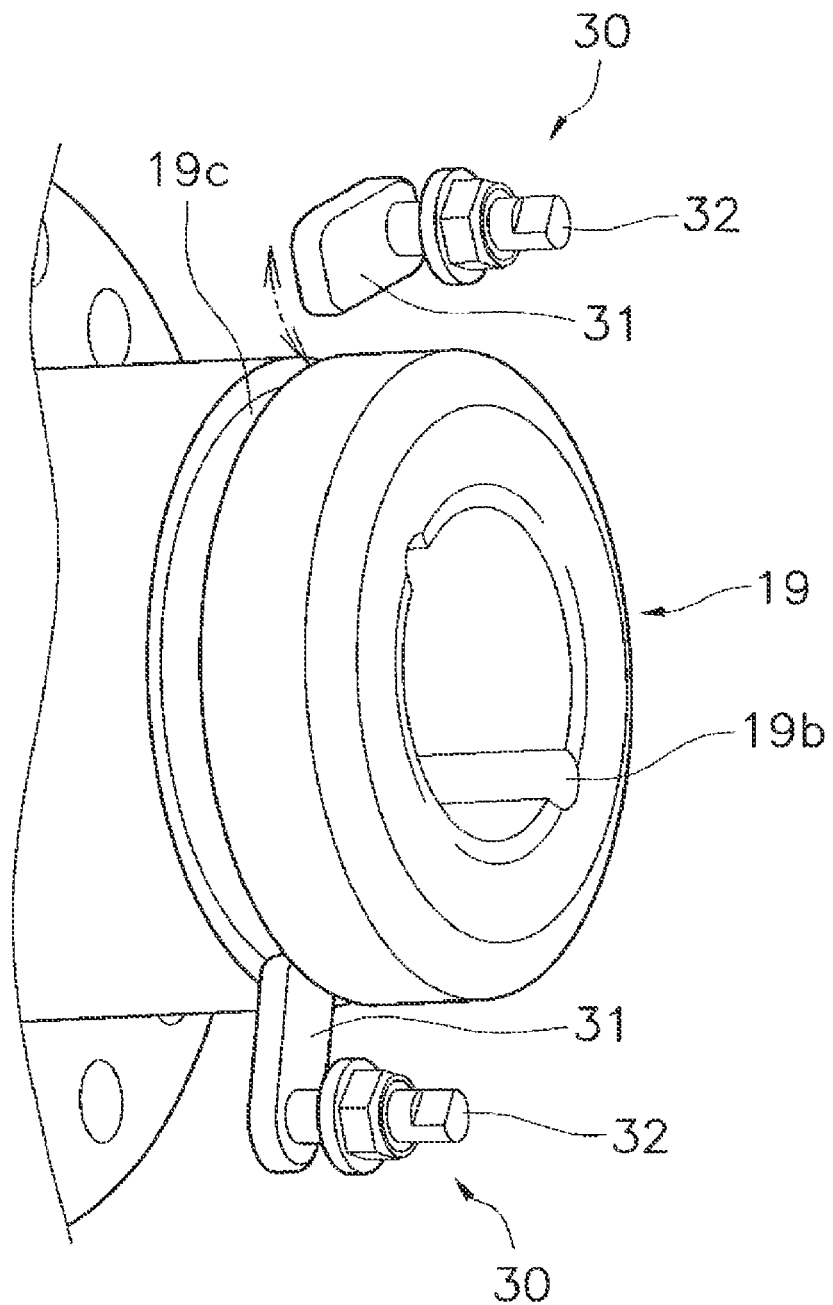
FIG. 6 is an enlarged detail view of FIG. 5.
Figure 7:
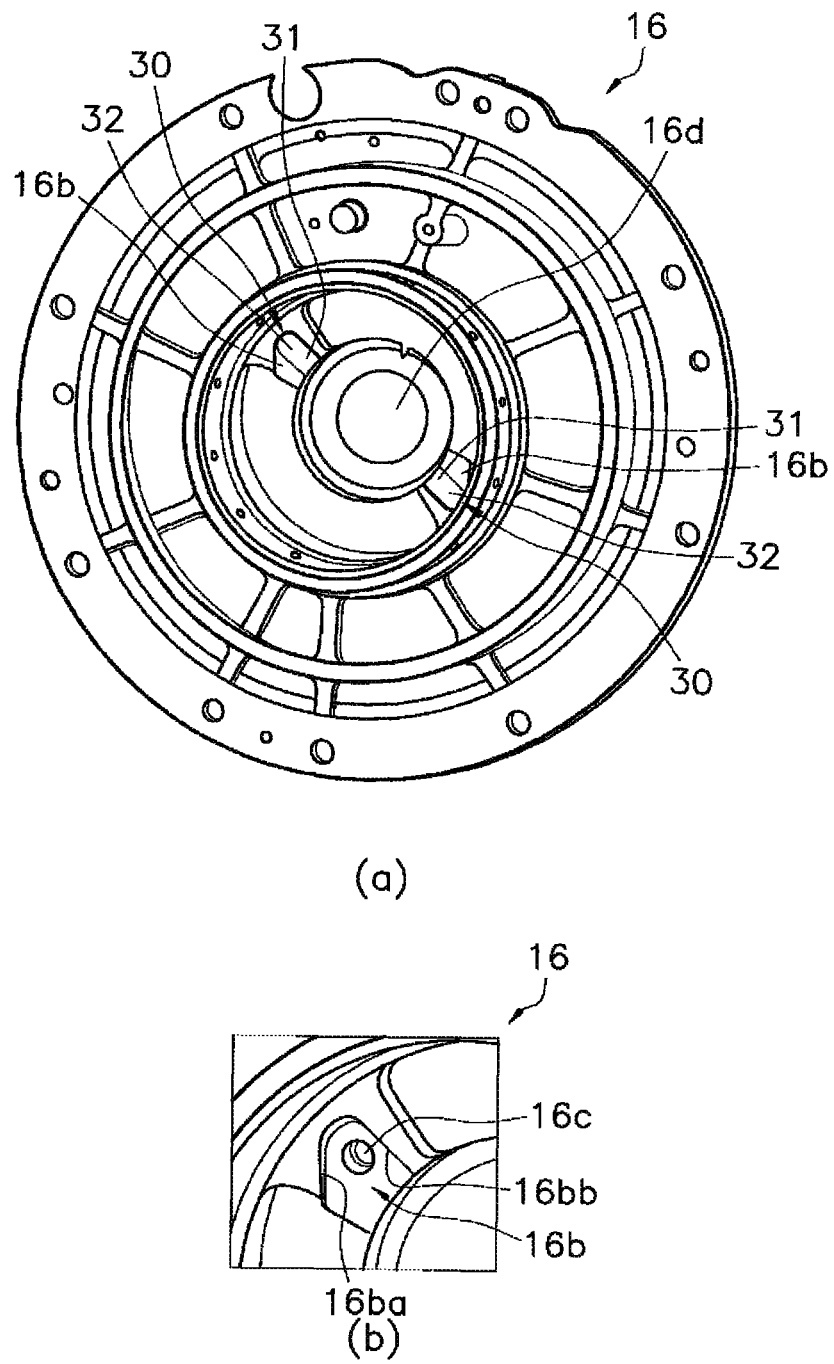
FIG. 7a is an oblique view of the flange as seen from the engine side.
FIG. 7b is an enlarged detail view thereof.

Consequently, the latching portions 31 can be retracted from the latching groove 19c of the rotational shaft 19, as is the latching member 30 disposed above in FIG. 6. Thus, the flange 16 is able to move in the axial direction with respect to the rotational shaft 19, so the flange 16 can be easily unlatched from the rotor-side members 50.

Also, in this embodiment, it is possible to switch between latched and unlatched states by the latching members 30 by rotating the latching portions 31 of the latching members 30 within the restricting grooves 16b of the flange 16 shown in FIG. 7b.

That is, the restricting grooves 16b are formed so that a state in which the side faces of the latching portions 31 of the latching members 30 are in contact with first end faces 16ba of V-shaped recesses in the restricting grooves 16b is the unlatched state, and a state in which these side faces are in contact with second end faces 16bb of the V-shaped recesses is the latched state.

Consequently, switching between the latched and unlatched states with the latching members 30 can be carried out reliably and easily.

Features

As shown in FIG. 4, the generator motor 1 in this embodiment comprises the flange 16 mounted on the hydraulic pump 4 side in the axial direction, the stationary-side members (the first and second housings 11 and 15, the stator 10, etc.) fixed on the engine 2 side in the axial direction when the flange 16 is removed, the rotor-side members 50 that can move to the hydraulic pump 4 side in the axial direction with respect to the stationary-side members when the flange 16 has been removed, and the latching members 30 that restrict relative movement of the flange 16 in the axial direction with respect to the rotor-side members 50.

Consequently, when the generator motor 1 is taken apart, the rotor-side members 50 can be removed in an integrated stated when the flange 16 is removed. Thus, the rotor-side members 50 will not fall out from the stationary side after the flange 16 has been removed by itself. As a result, the rotor-side members 50 can be reliably prevented from falling out during disassembly of the generator motor 1, and damage to the parts included in the rotor-side members 50 can be prevented.

Other Embodiments

An embodiment of the present invention was described above, but the present invention is not limited to or by the above embodiment, and various modifications are possible without departing from the gist of the invention.

(A) In the above embodiment, an example was described in which substantially L-shaped members capable of rotating around the rotary shafts 32 were used as the latching members 30 that integrate the rotor-side members 50 in the removal of the flange 16, but the present invention is not limited to this.

Figure 8:
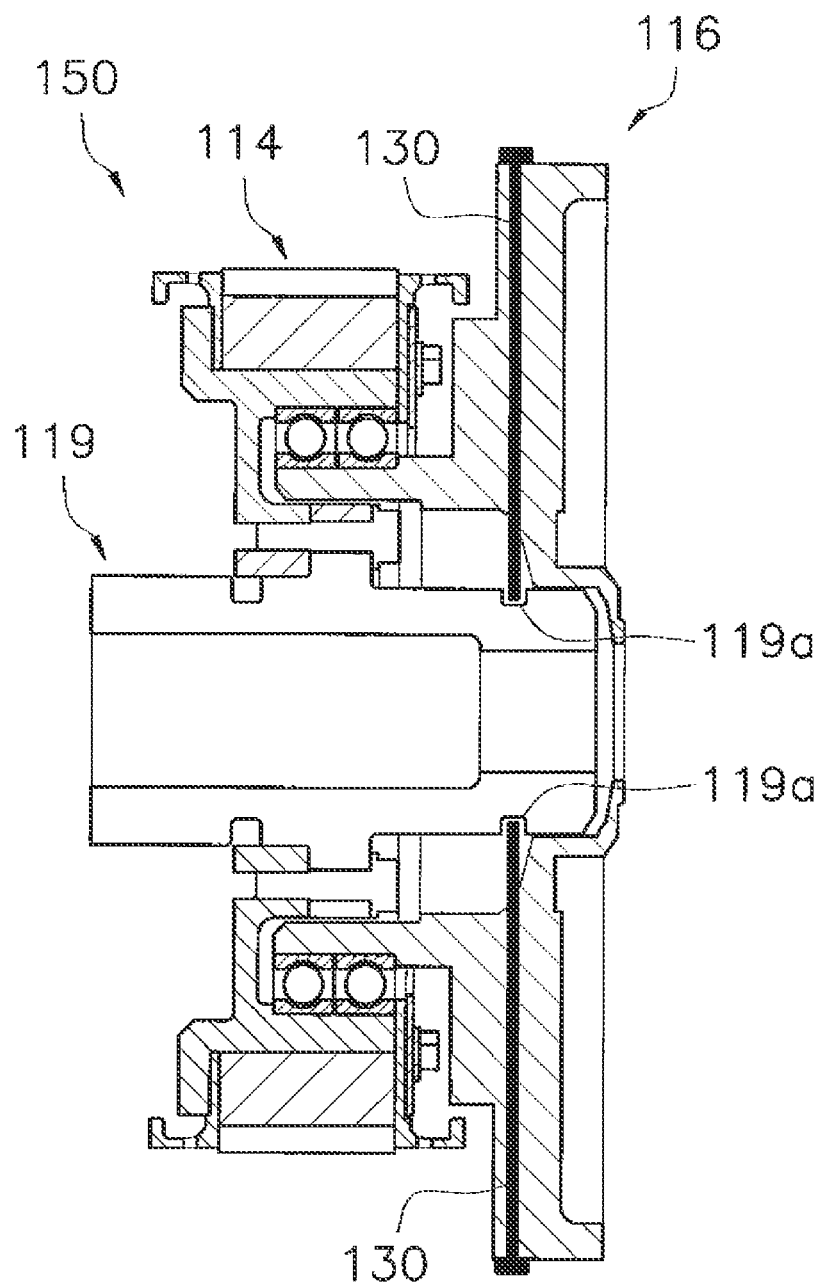
FIG. 8 is a cross section of the configuration of the rotor-side members included in the generator motor pertaining to another embodiment of the present invention.

For example, as shown in FIG. 8, bolts 130 that are inserted in the radial direction through the outer peripheral face on the outside of a flange 116 in the radial direction and that are long enough to reach a latching groove 119a formed in the outer peripheral face of a rotational shaft 119 may be used as latching members.

Here again, the distal ends of the bolts 130 are not in contact inside the latching groove 119a. Therefore, relative movement between the rotational shaft 119 and the flange 116 in the axial direction can be restricted without affecting the rotation of the rotor-side members 150 in the assembled state of the generator motor. Thus, when the generator motor is taken apart, the rotor-side members 150 can be prevented from falling out from the stationary side after the flange 116 has been removed, by removing the flange 116 in a state of being integrated with the rotor-side members 150 including the rotational shaft 119 and the rotor 114.

(B) In the above embodiment, an example was described in which substantially L-shaped members capable of rotating around the rotary shafts 32 were used as the latching members 30 that integrate the rotor-side members 50 in the removal of the flange 16, but the present invention is not limited to this.

Figure 9:
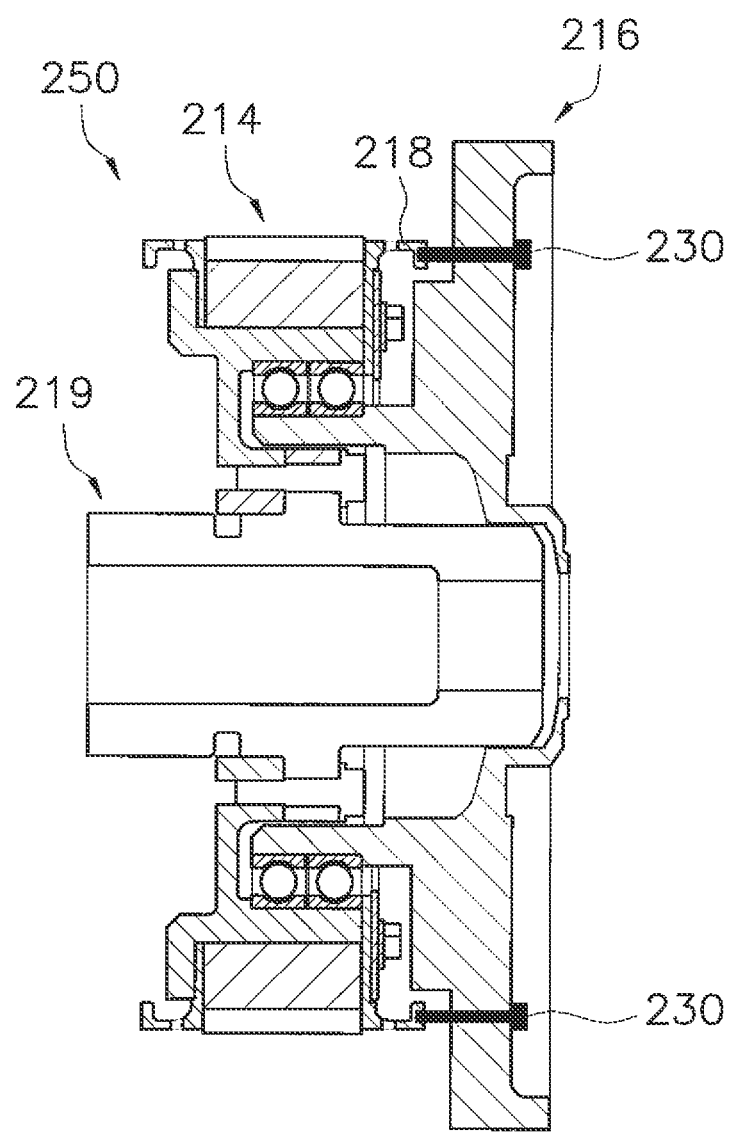
FIG. 9 is a cross section of the configuration of the rotor-side members included in the generator motor pertaining to yet another embodiment of the present invention.

As shown in FIG. 9, for example, bolts 230 that are inserted in the axial direction through openings formed in the face of a flange 216 on the hydraulic pump 4 side and whose distal ends thread to blades 218 included in a rotor 214 may be used as the latching members.

In this case, since the flange 216 and the rotor-side members 250 are integrated and their movement is restricted in the rotational direction as well, this embodiment cannot be used as a generator motor in the state shown in FIG. 9. Thus, when the generator motor is taken apart, the bolts 230 may be inserted through the face of the flange 216 on the hydraulic pump side and fixed to the blades 218.

Consequently, relative movement between the rotational shaft 219 and the flange 216 can be restricted in the axial direction and the two components integrated only during disassembly work. Thus, when the generator motor is taken apart, the rotor-side members can be prevented from falling out from the stationary side after the removal of the flange 216 by attaching the flange 216 in a state of being integrated with the rotor-side members 250 including the rotational shaft 219 and the rotor 214.

(C) In the above embodiment, an example was described in which the latching members 30 were provided on the flange 16 side, but the present invention is not limited to this.

For example, the configuration may be such that latching members are provided on the side where the rotational shaft and rotor are included in the rotor-side members, and the latching portions hooked to grooves, steps, or the like on the flange to restrict relative movement in the axial direction.

(D) In the above embodiment, an example was described in which two latching members 30 were provided, but the present invention is not limited to this.

For example, as long as the rotor-side members can be integrated when the flange is removed, just one latching member may be used, or three or more latching members may be used.

(E) In the above embodiment, an example was described in which the generator motor 1, etc., of the present invention was installed in a hybrid hydraulic excavator, but the present invention is not limited to this.

For example, the present invention can also be applied to a generator motor that is installed in a hybrid wheel loader, bulldozer, dumper truck, or other such piece of construction machinery, or to a hybrid automobile or the like.

Also, in the above embodiment, an example was described in which the engine 2, the generator motor 1, and the hydraulic pump 4 were disposed serially in that order, but the present invention is not limited to this.

For example, the configuration may be such that a generator motor is directly linked to a PTO (power takeoff).

(F) In the above embodiment, an example was described in which an SR (switched resistance) motor was used as the generator motor 1, but the present invention is not limited to this.

For example, a PM (permanent magnet) motor or other such generator motor may be used.

The generator motor of the illustrated embodiments has the effect of effectively preventing rotor-side members from falling out from the stationary side during the disassembly of a generator motor, and therefore can be widely applied to generator motors that are installed in various kinds of vehicle, such as construction machines and passenger cars.

The invention claimed is:

1. A generator motor comprising:
   a flange removably mounted on a first end side in an axial direction;
   stationary-side members fixed on a second end side that is on an opposite side from the first end side in the axial direction;
   rotor-side members configured to move toward the first end side in the axial direction with respect to the stationary-side members in a state in which the flange has been removed, one of the rotor-side members having a latching groove on an outer peripheral face; and
   latching members configured to restrict relative movement of the flange in the axial direction with respect to the rotor-side members, each of the latching members being inserted into the latching groove of the one of the rotor-side members with a prescribed gap being formed between the latching member and the one of the rotor-side members while the one of the rotor-side members rotates in usage state.

2. The generator motor according to claim 1, wherein the latching members are provided to the flange.

3. The generator motor according to claim 1, wherein the latching members are provided near an outer peripheral face of a rotary shaft included in the rotor-side members.

4. The generator motor according to claim 1, wherein
   the latching members configured to rotate around a rotary shaft, and
   rotation of the latching members switches between a latched state in which the stationary-side members and the rotor-side members are integrated in the axial direction, and
   an unlatched state in which integration between the stationary-side members and the rotor-side members has been released.

5. The generator motor according to claim 4, further comprising
   restricting grooves configured to restrict a rotational range of the latching members.

6. The generator motor according to claim 1, wherein the latching members are substantially L-shaped members.

7. The generator motor according to claim 1, wherein the latching members are inserted into the latching groove in usage state, and retracted from the latching groove when the flange and the rotor-side members are separated.

8. The generator motor according to claim 1, wherein the stationary-side members include a first housing fixed on an adjacent engine side, a second housing joined to the first housing, and a stator provided in a space inside the first and second housings.

9. The generator motor according to claim 1, wherein the rotor-side members include a rotary shaft and a rotor that rotates around the rotary shaft.

10. The generator motor according to claim 1, wherein the stationary-side members are fixed with respect to an engine when the generator motor is disposed between a hydraulic pump and the engine installed in construction machinery.

* * * * *